United States Patent [19]

Blouch

[11] 3,827,843

[45] Aug. 6, 1974

[54] APPARATUS FOR LINING BOTTLE CROWNS WITH THERMOPLASTIC MATERIAL

[75] Inventor: John H. Blouch, Terre Haute, Ind.

[73] Assignee: Sycamore Manufacturing Company, Inc., Terre Haute, Ind.

[22] Filed: Aug. 20, 1973

[21] Appl. No.: 389,961

Related U.S. Application Data

[60] Continuation of Ser. No. 221,096, Jan. 26, 1972, abandoned, Division of Ser. No. 43,513, June 4, 1970, abandoned.

[52] U.S. Cl. ............... 425/127, 425/128, 425/809
[51] Int. Cl. ............................................. B29c 1/04
[58] Field of Search ........... 425/110, 113, 114, 127, 425/128, 121, 345, 344, 809, 123, 124, 125, 126

[56] References Cited
UNITED STATES PATENTS

| | | | |
|---|---|---|---|
| 2,539,916 | 1/1951 | Ludington et al. | 425/311 |
| 2,835,926 | 5/1958 | Maier et al. | 425/809 |
| 2,881,475 | 4/1959 | Wilckens | 425/809 |
| 2,963,738 | 12/1960 | Brandes | 425/809 |
| 3,212,131 | 10/1965 | Aichele | 425/809 |
| 3,278,985 | 10/1966 | Everett | 425/127 |
| 3,360,827 | 1/1968 | Aichele | 425/809 |
| 3,407,442 | 10/1968 | Wright | 425/809 |
| 3,493,995 | 2/1970 | Green | 425/128 |
| 3,577,595 | 5/1971 | Smith | 425/809 |

Primary Examiner—J. Howard Flint, Jr.
Attorney, Agent, or Firm—Hill, Gross, Simpson, Van Santen, Steadman, Chiara & Simpson

[57] ABSTRACT

Apparatus for lining closure caps or bottle crowns with thermoplastic material includes conveying the crowns to dispensing means wherein a metered quantity of thermoplastic material, heated to a moldable or plastic state, is deposited into the crown and then transferring the filled crowns to a forming station. In order to mold the material into a sealing gasket configuration a forming member is resiliently driven toward a central portion of the crown to substantially instantaneously squeeze the material between the forming member and the crown wall portion while enabling a portion of the material to flow into an annular space surrounding a periphery of the forming member. The forming member is held under spring pressure in the molding position and for a time interval selected to enable sufficient air cooling to set the material.

8 Claims, 8 Drawing Figures

APPARATUS FOR LINING BOTTLE CROWNS WITH THERMOPLASTIC MATERIAL

This is a continuation-in-part of U.S. Pat. application Ser. No. 221,096, filed Jan. 26, 1972, now abandoned, as a division of U.S. Pat. application Ser. No. 43,513, filed June 4, 1970, now abandoned.

BACKGROUND OF THE INVENTION

1. Field of the Invention

The present invention generally relates to an apparatus for molding thermoplastic material and more particularly refers to a method and an apparatus for forming resilient sealing gaskets of thermoplastic material in closure caps or bottle crowns on a continuous mass production basis.

2. Description of the Prior Art

Caps or crowns for closing bottles and like containers normally include a cork sealing disc secured into the caps or crowns by a suitable adhesive. Mass production apparatus for applying the adhesive and positioning the cork disc in the crown are presently employed for a majority of the production of bottle crowns. Due to an increasing difficulty in procuring cork of the proper quality and in the required quantity, several efforts have been made recently to produce bottle crowns lined with thermoplastic material. Since the necessary labor costs per unit and the required capital expenditure are dependent upon the production rate of the individual crown lining machines and their initial cost, there is a continuing effort to provide a low cost, high production method and apparatus for lining bottle crowns with thermoplastic material as exemplified in the U.S. Pat. to E. O. Aichele No. 3,360,827, dated Jan. 2, 1968.

Some of the presently utilized plastic lining methods and apparatus deposit a measured quantity of thermoplastic material in the crown and then form the material into a gasket configuration with forming means mounted for reciprocal movement. Those machines usually utilize rigid, positive means for reciprocating the forming members and controlling the forming stroke so that at an end of the stroke the forming members are spaced a certain distance from a central wall portion of the crown. Shock forces, with resulting wear due to the required acceleration and deceleration of the rigidly supported and reciprocated forming heads heretofore utilized, have limited the speed of operation. Further, most known prior art crown lining apparatus include a small number of individual forming heads utilizing liquid means for dissipating sufficient thermal energy to harden and set the thermoplastic material in the proper configuration. Although few individual forming heads are utilized, the necessary liquid passageways and the required auxiliary equipment, such as cooling towers, piping, pumps and the like, have made those machines unduly expensive for the smaller bottle crown manufacturers.

Depositing the metered quantity of the thermoplastic material into the crowns is another area limiting the production rate of most prior art plastic lining apparatus. When the known prior art dispensing means are operated at an acceptable production rate, those means have not consistently and properly positioned the material in the bottle crowns and have not exhibited an acceptable tool life.

SUMMARY OF THE INVENTION

Apparatus for lining closure caps or bottle crowns with thermoplastic material comprising a conveyor conveying the crowns to a dispensing station including a nozzle depositing a metered quantity of heated thermoplastic material in a moldable state into each of the crowns, means resiliently urged a forming head into molding contact to form the material into a gasket configuration and then resiliently maintain the head in contact with the material while air cooling the same to a hardened or set condition.

The dispensing station heats the thermoplastic material to a moldable or plastic state and discharges a column of material at a constant discharge rate and with a certain cross sectional area. A knife driven in synchronism with means conveying the crowns severs a certain length of the column and directs the severed length into each of the crowns as the same are conveyed therebelow. The knife rotates about an axis horizontally offset from the point of discharge of the material so that as the knife severs the column, the knife imparts a downwardly directed impetus to the severed slug of material for directing the material into the crowns.

The forming operation is accomplished at a separate forming station characterized by a rotating, annular anvil surface receiving the filled crowns and a plurality of circumferentially spaced forming heads supported for rotational movement with the anvil surface and for reciprocal movement perpendicular thereto. In order to transfer the filled crowns from the conveying means to the anvil surface, cam means successively move the forming heads against the urging of resilient biasing means to a position spaced from the anvil surface, thereby enabling insertion of the filled crowns between a lower end of the forming heads and the anvil surface. The cam means then enable an incremental movement of the forming heads toward the anvil surface and into overlapping engagement with an upstanding flange formed on each one of the crowns for transferring the same from the conveying means and to the forming station. Further rotational movement of the forming station raises a striking member against resilient biasing means so that the combined forces of the resiliently urged striking member and the resiliently urged forming head suddenly drive the head into molding contact with the thermoplastic material. The extent of the molding or downward stroke is limited only by the compressibility of the material and need not be positively limited.

Subsequent to molding the material into a gasket configuration, the forming heads are resiliently held in the molding position for a time interval to enable sufficient air cooling of the thermoplastic material for setting the same in the molded configuration. At a point along a path of movement of the forming station sufficiently spaced from a point where the material is molded, the cam means successively raise the forming heads to enable the lined crowns to be discharged and to position the forming heads for receiving another filled crown from the conveying means.

DETAILED DESCRIPTION OF CERTAIN PREFERRED EMBODIMENTS

Referring to the drawings, an apparatus 10, constructed in accordance with the principles of the present invention, comprises conveying means 11 supporting a plurality of closure caps or bottle crowns 12 and transporting the crowns under heating means 13 and then to a dispensing station 14 wherein a metered quantity of thermoplastic material heated to a plastic or moldable state is deposited into each of the crowns. A forming station, generally indicated at 16, receives the crowns 12 filled with a slug of material 17 and molds the slug of material into a gasket configuration. Subsequent to the molding operation, the material is maintained under spring pressure and in the molded configuration until the material air cools sufficiently to set or harden, whereupon the lined crown is transferred to discharge conveying means 18.

Figures 6, 8:
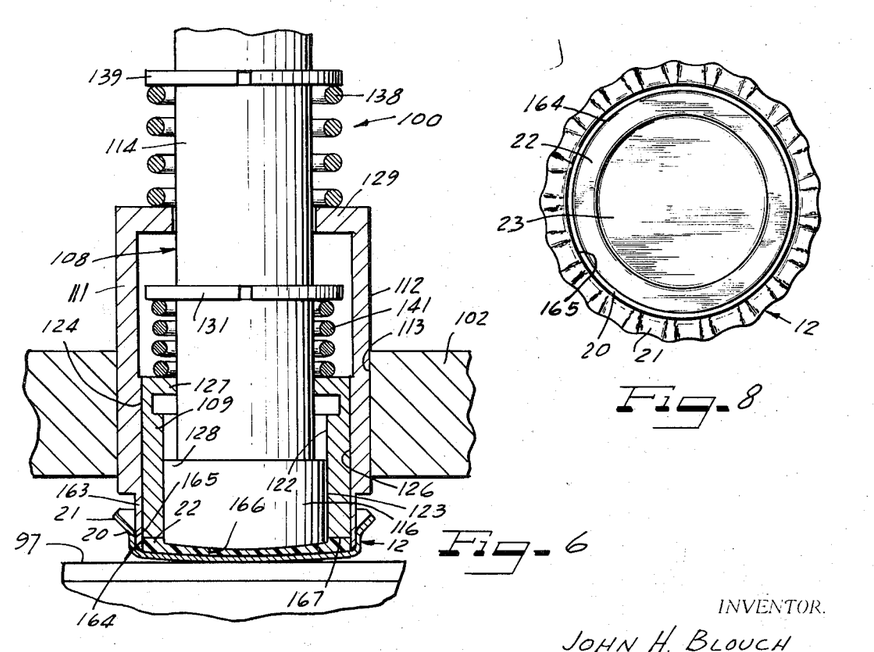
FIG. 6 is an enlarged, longitudinal sectional view of a forming head of the present invention shown in a molding or forming position.
FIG. 8 is an enlarged top plan view of a bottle crown lined with thermoplastic material by the apparatus of the present invention.

As best illustrated in FIGS. 6 and 8, each of the completed crowns 12 has a central, domed wall portion 19 sized to close an open end of a bottle or similar container and providing a backing surface for a liner or a gasket. An offset sidewall portion 20 extends around a periphery of the central wall portion 19 and is characterized by an outwardly flared margin 21 adapted to be crimped into gripping engagement with an appropriately formed rim on the bottle closed by the crown 12.

The slug of thermoplastic material 17 is formed or molded into a sealing gasket characterized by an annular ridge or rim 22 sized to sealingly engage a peripheral edge defining the bottle opening and a central web portion 23. The central web portion 23 of the sealing gasket or liner provides a sanitary lining for the crown 12 and assists in retaining the annular ridge 23 in firm assembly with the bottle crown. Thus, it is desirable to form the central web portion 23 with a thickness as thin as practical, thereby to minimize the quantity of thermoplastic material required to form the gasket or liner.

Figure 1:
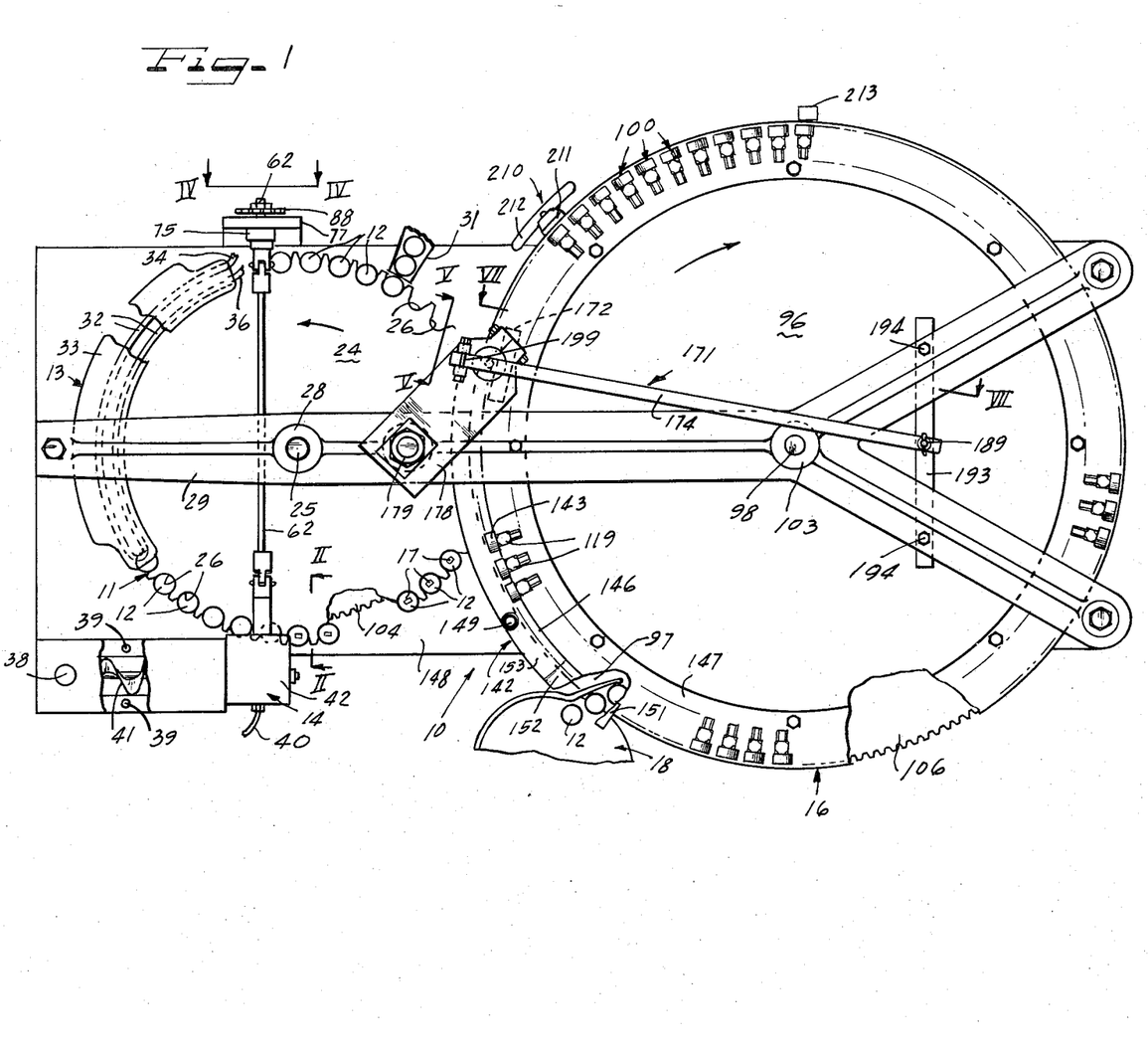
FIG. 1 is a top plan view, with portions broken away to show additional details, illustrating an apparatus, embodying the principles of the present invention, for lining closure caps or bottle crowns with thermoplastic material.
Figures 2, 3:
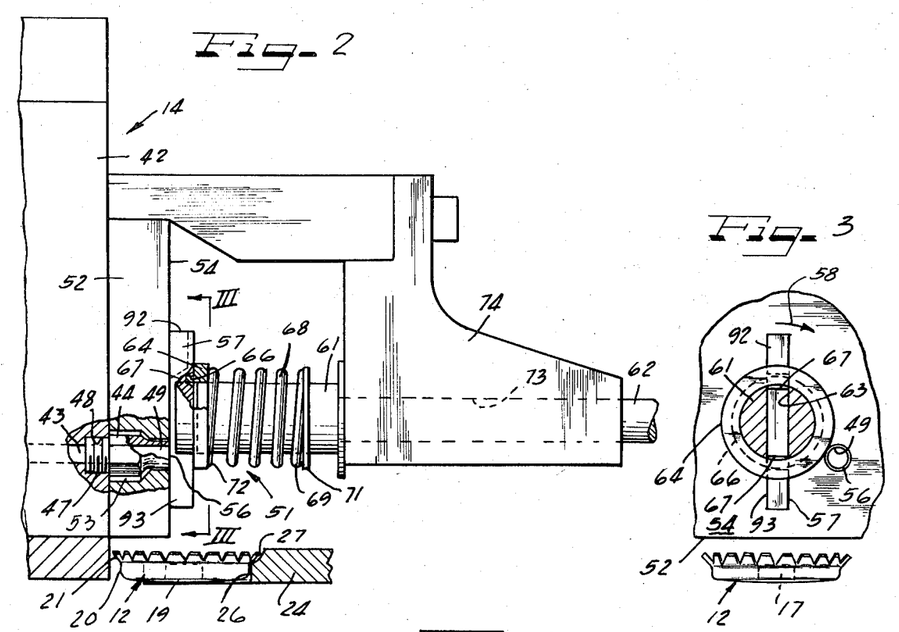
FIG. 2 is an enlarged, side elevational view, with portions broken away, taken approximately along line II—II of FIG. 1 and illustrating a dispensing station of the present invention.
FIG. 3 is a partial sectional view taken along line III—III of FIG. 2.
Figure 4:
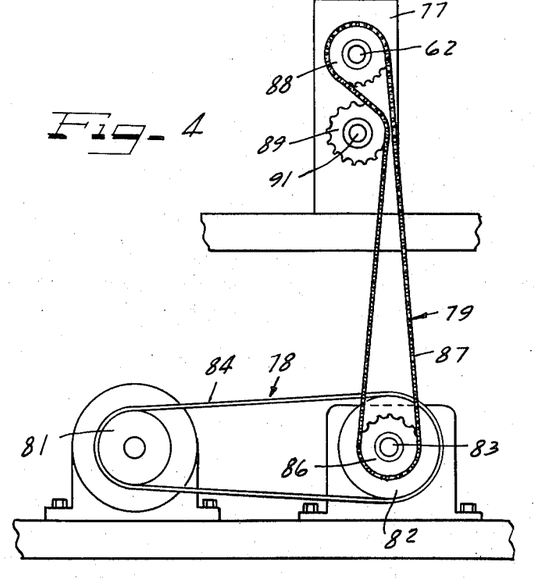
FIG. 4 is a side elevational view taken along line IV—IV of FIG. 1 and illustrating drive means for the dispensing station.

As illustrated in FIGS. 1 and 2, the conveying means 11 include a turntable conveyor 23 mounted on an upstanding shaft 24 for corotation therewith and having a plurality of equally circumferentially spaced notches 26 formed around a margin thereof for receiving and supporting the crowns 12. Each of the notches 26 are sized to loosely receive the offset sidewall portion 20 of the crowns 12 and have a peripheral recess 27 providing clearance for the outwardly flared portion 21 of the crowns. In that manner, the outwardly flared portion 21 of the crowns 12 are seated on a periphery of the notches 26, thereby supporting the crowns 12 for rotational movement with the conveyor 24. An upper end portion of the shaft 25 is journaled within a boss 28 formed on an upper, Y-shaped frame member 29, and a lower end of the shaft is properly supported in appropriate bearing means. A suitable source of power, such as an electric motor, interconnected to the shaft 25 via a variable speed drive, rotates the table conveyor 26 in a counterclockwise direction. A chute 31, supplied with properly positioned crowns directs the crowns 12 into successive ones of the notches 26 as the turntable conveyor 24 rotates therebelow, and the crowns 12 are advanced by the conveyor from the supply chute and through the heating means 13.

The heating means 13 may include an electric heating element 32 supported over the conveyor 24 and shielded by an appropriate cowling 33. The heating element 32 follows the curvature of an outer periphery of the conveyor 24 and has opposite end portions 34 and 36 appropriately connected to an electric power supply.

In accordance with the present invention, the heating element 32 is sized to preheat the empty crowns 12 to a temperature in a range of about 275° to 325° F. to insure proper adhesion of the thermoplastic material to the crowns. Although the embodiment illustrated in the drawings includes an electric heating element, successful results have been obtained with gas heating nozzles disposed beneath the conveyor 24 and directed toward the periphery thereof. If desired control means including a temperature sensor may be utilized in conjunction with the heating means to maintain the crown temperature within the proper range.

Referring now to FIGS. 1 through 4, inclusive, the dispensing means 14 heat pellets or granules of thermoplastic material to a plastic or moldable state and deposits the metered quantities or slugs 17 of the material into successive ones of the crowns 12 as they are conveyed therebeneath. The material is preferably a thermoplastic compound such a polyethylene or a vinyl resin such as polyvinyl chloride or a copolymer of vinyl chloride and vinyl acetate. Also, a thermosetting resin such as a suitable epoxy resin compound may be utilized with the present invention. The pellets of material gravitationally flow into an inlet opening 38 of the dispensing means 14, where suitable electric heating means 39 supplied with electric energy via the leads 40 melt the pellets. Screw conveying means, such as a screw conveyor 41, advance the molten material to a dispensing head 42.

In accordance with the principles of the present invention, the dispensing head 42 (FIG. 2) has a flow passageway 43 receiving the plastic material from the conveyor 41 and supplying the material to a nozzle 44. The nozzle 44 includes a substantially cylindrical body portion 46 having a reduced end portion 47 threadingly engaged into complementally formed threads 48 in the passageway 43. A central throughbore 49 formed in the nozzle 44 receives the material in a plastic or moldable state from the flow passageway 43 and opens directly over the crowns 12 conveyed beneath the dispensing means 14. The diameter of the nozzle throughbore 49 is selectively sized to discharge a column of material having a consistent and known cross sectional area. Further, by controlling operation of the conveyor 41 the rate of discharge of the material may be controlled so that the volume of material discharged from the nozzle 44 per unit of time may be selected and synchronized relative to the circumferential speed of the conveyor 24 thereby to discharge the exact quantity of material required to make one liner for each crown conveyed under the dispensing means 14.

It is also contemplated by the present invention to provide knife means 51 for severing the discharged column of material into lengths having the necessary volume to form one liner and for imparting a downward impetus to the severed lengths or slugs 17 of material directed to deposit the slugs 17 of the material centrally in successive ones of the crowns 12 passing beneath the dispensing means 14. The knife means 51 include a plate 52 secured to the dispensing head 42 and having a clearance aperture 53 receiving the nozzle 44. An outer face 54 is flush with an outlet end 56 of the nozzle 44 and cooperates with a rotating knife blade 57 for severing the discharged column into the appropriately sized slugs 17. The knife blade 57 is rotated about a horizontal pivot axis horizontally and vertically offset from the outlet end 56 the knife blade need not necessarily be a rotating knife, but may be a knife actuated by various other mechanical means, one example of which is a reciprocating knife, and therefore the knife means no direct point of novelty of the present invention. The horizontal disposition of pivot axis and the direction of rotation, as indicated by the arrow 58 (FIG. 3), are selected so that the knife 57 imparts a generally downwardly directed impetus to the severed slug 17 for positively depositing the slugs into the crowns 12, without relying upon the configuration of the blade to properly direct the slug.

In order to rotatably support the knife blade 57, a blade holder 61 formed at one end of a rotatably mounted shaft 62 has a diametrically extending slot 63 receiving the knife blade. The knife blade 57 is retained within the slot 63 by a collar 64 having an axially extending, annular flange 66 engaging spaced notches 67, 67 in the knife blade. A compression spring 68 has one end portion 69 bottomed against a snap ring 71 carried on the blade holder 61 and another end portion 72 engaging the collar 64, thereby resiliently urging the knife blade 57 into contact with the cooperating face 54 formed on the plate member 52.

The shaft 62 supporting the blade holder 61 and thus the knife blade 57 has one end portion received in a bore 73 formed in a suitable bracket 74 and another end portion journaled in bearing means 75, which in turn are supported in an upstanding bracket 77, as illustrated in FIG. 1. In order to rotate the knife blade 57 in synchronism with the turntable conveyor 24, the motor rotating the turntable rotates the shaft 62 via a belt drive 78 and a chain drive 79. The belt drive 78 includes a first pulley 81 driven by the prime mover, a second pulley 82 supported on a shaft 83 for corotation therewith and a suitable belt 84 trained around the pair of pulleys. A sprocket 86 carried on the shaft 83 for corotation therewith drives a chain 87 which in turn is trained over sprockets 88 and 89. The sprocket 88 is keyed to an outermost end of the shaft 62, whereas the sprocket 89 is supported on a separate shaft 91 and defines a return run of the chain 87. The pulleys, sprockets and chain are selected to rotate the knife blade 57 in timed relation to the conveyor.

As illustrated in the drawings, opposite end portions 92 and 93 of the knife blade 57 project outwardly a sufficient distance to overlap the outlet end 56 of the nozzle bore 49 so that two separate slugs of material are severed from the discharged column during each revolution of the shaft 62. Thus, the pulleys and sprockets driving the shaft 62 are selectively sized to rotate the shaft 62 one-half revolution as the turntable 24 rotates a sufficient distance to advance one of the crowns 12 past the dispensing means 14.

The crowns 12 each having one of the slugs 17 of thermoplastic material heated to a plastic or moldable state are conveyed by the turntable 24 from the dispensing means 14 and to the forming station 16, wherein the material is formed into a gasket configuration, held under spring pressure and sufficiently air cooled to set or harden the material.

In accordance with the present invention, the forming station, as illustrated in FIGS. 1, 5, 6 and 7, comprises a table or bedplate 96 forming an annular anvil surface 97 and mounted on an upstanding shaft 98 for rotation about a vertical pivot axis. A plurality of circumferentially equally spaced forming heads 100 supported within a pair of vertically spaced support members 101 and 102 for reciprocal movement toward and away from the anvil surface 97 enter the caps for transferring the same from the conveying means 13 and onto the anvil surface 97 and for forming the slug 17 into the gasket configuration, as illustrated in FIGS. 6 and 8. The shaft 98 has an upper end portion journaled within a boss 103 formed on the Y-shaped member 29 and an opposite end portion journaled within an appropriate bearing means disposed beneath the table 96. The axis of rotation of the table 96 is positioned relative to the rotational axis of the turntable conveyor 24 so that in a region where the paths of the rotating table and the rotating conveyor are tangent the annular anvil surface 97 underlies the notches 26 and thus the filled crowns 12. In order to rotate the anvil surface 97 in synchronism with the turntable conveyor 24, a pair of intermeshing gears 104 and 106 are respectively carried on the shafts 25 and 98 for corotation therewith.

Figure 5:
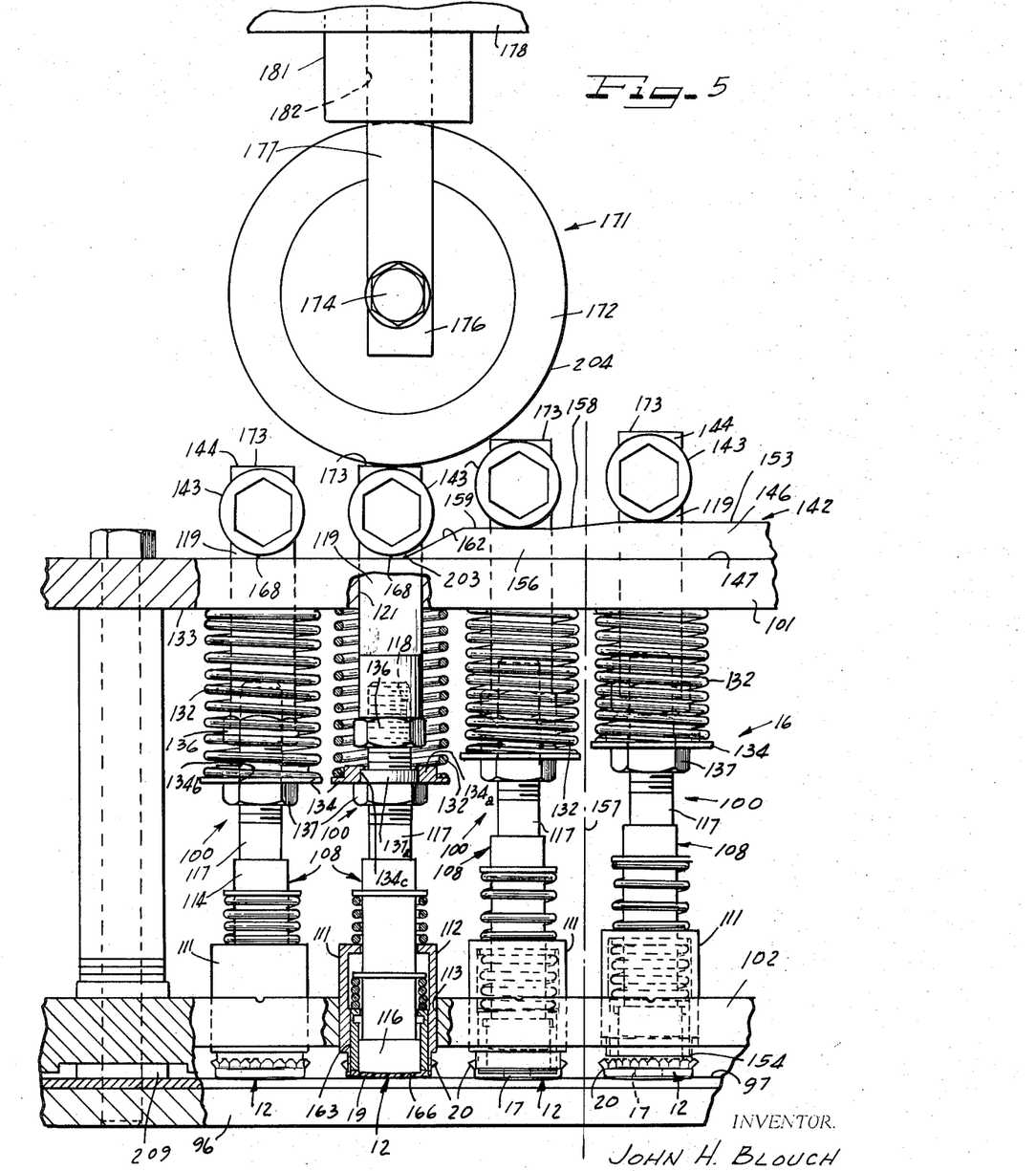
FIG. 5 is an enlarged view taken along line V—V of FIG. 1 and illustrates a portion of a forming station of the present invention.

As illustrated in FIGS. 5 and 6, each of the forming heads 100 has telescopically related members including a central plunger 108, an intermediate collar 109 and an outer cylindrical member 111 having an outer cylindrical wall portion 112 slidably received within an aperture 113 formed in the lower support member 102 for guiding reciprocal movement of the forming head 100. The plunger 108 is a cylindrical member having a central body portion 114, an enlarged forming head 116 and a reduced, threaded upper end portion 117. The threaded end portion 117 of the plunger 108 is received in a complementally threaded aperture 118 formed in an upper guide part 119, which in turn is slidably received in a complementally formed aperture 121 in the upper support member 101.

The collar or intermediate member 109 has an inner cylindrical wall surface 122 sized to closely receive an outer cylindrical wall portion 123 formed on the enlarged head portion 116 of the plunger 108, thereby guiding movement of the collar axially of the plunger. Further, an outer cylindrical surface 124 on the collar 109 slidably engages an inner cylindrical wall surface 126 formed on the outer member 111. Downward or outward movement of the collar 109 is limited by cooperation between an inturned flange 127 at an upper end portion of the collar and a shoulder 128 formed on the plunger 108 by the enlarged forming head 116, whereas downward or outward movement of the outer member 111 relative to the plunger is limited by cooperation between an inturned flange 129 and a snap ring 131 carried on the body portion 114 of the plunger.

In accordance with the principles of the present invention, each of the reciprocally mounted, telescopically related parts 108, 109 and 111 is individually, downwardly biased by resilient means, such as compression springs. As illustrated in FIG. 5 a coil compression spring 132 has one end portion bottomed against an underneath surface 133 of the upper support member 101 and another end acting against a C-shaped washer 134 having a raised boss 134a forming a pilot for the spring 132. A nut 137 threaded onto the upper threaded portion 117 of the plunger 108 adjustably positions the washer along the plunger to selectively vary the bias of the spring. A transverse slot 134b enables the washer 134 to be laterally slipped onto the plunger 108 between the nut 137 and the lower end of the spring 132, and a recess 134c receives a reduced portion 137a on the nut to retain the washer centrally on the plunger, thereby to facilitate assembly.

A jam nut 136 threaded onto the plunger 108 and disposed within coils of the spring 132 engages the upper guide 119 to prevent movement of the plunger relative to the guide.

Referring to FIGS. 5 and 6, the outer member 111 is downwardly urged by a coil compression spring 138 captured between the inturned flange 129 and a snap ring 139 carried on the body portion 114 of the plunger 108. Another coil compression spring 141 resiliently urges the intermediate member or collar 109 downwardly and has opposite end portions acting against the inturned flange 127 and the snap ring 131. The spring 132 is sized to have a biasing force in excess of the combined forces of the springs 138 and 141, thereby to hold the plunger 108 in the forming position, as illustrated in FIG. 6.

In order to control the vertical position of the forming head 100 and its component parts 108, 109 and 111 relative to the anvil surface 97, the present invention provides cam means generally indicated at 142 cooperating with rollers 143 carried on an upper end portion 144 of the guide posts 119 and disposed above the upper support member 101. The cam means 142 include an arcuately shaped plate member 146 partially overlying an upper surface 147 of the upper support member 101 and being fixedly attached to a stationary frame portion 148 by appropriate means such as upstanding posts and fasteners 149, as illustrated in FIG. 1. A leading end 151 of the cam plate 146 disposed upstream of the region of tangency between the anvil surface 96 and the turntable conveyor 24, has an upwardly inclined cam surface 152 extending from the upper surface 147 of the support member 101 and upwardly to an arcuately extending, planar surface 153 spaced above the upper surface. The height of the planar surface 153 on the cam plate 146 relative to the anvil surface 97 is sized so that the forming heads 100 are sufficiently raised against the resilient biasing of the springs 132 to position a lowermost end portion 154 of each of the forming heads 100 above the anvil surface a distance enabling insertion of one of the crowns 12 between the forming heads and the anvil surface and in registry with one of the forming heads. A trailing end 156 of the arcuate cam plate 146, disposed in the region of tangency between the rotatable anvil surface 97 and the turntable conveyor 24, as indicated by a center line 157, has a cam surface 158 extending between the planar surface 153 and a lower planar surface 159, thereby enabling the forming heads 100 to move toward the anvil surface 97 under the influence of the springs 132 and into a slight overlapping engagement with the sidewall portions 20 of the crowns 12. In that manner, the crowns 12 are positively transferred from the notches 26 on the turntable conveyor 24 and onto the anvil surface 97 of the forming station 16.

A steeply sloped cam surface 161 extending downwardly from a terminal end 162 of the planar surface 159 enables the forming head 100 to be suddenly driven toward the anvil surface 97 under the resilient biasing force of the compressed spring 132 for substantially instantaneously squeezing the slug of material 17 to form the same into a gasket configuration.

During the forming stroke, as the rollers 143 roll down the steeply sloped surface 161, a lowermost reduced end portion or depending rim 163 on the outer member 111 bottoms on an inside surface of the crown wall portion 19 and forms a cylindrical dam defining an outer periphery 164 of the annular gasket ridge 22, thereby preventing flow of the material onto inside surfaces 165 of the crown flange 20. Further downward movement of the forming head 100 drives a lowermost, forming end 166 of the plunger 108 toward the crown central wall portion 19 and into forming contact with the slug 17 of the material, thereby squeezing the material and causing the same to flow radially outwardly toward the inner cylindrical surface 122 of the outer member 111. The forming end 166 has a domed configuration formed complementally to the domed wall portions 19 of the crowns 12.

The outwardly flow of the squeezed material increases pressure on a lower, annular end 167 of the intermediate member or collar 109 to move that member upwardly against the bias of the spring 141 for enabling the material to flow into an annular space defined between the inner cylindrical surface 126 of the outer member and the outer cylindrical surface 123 of the plunger forming head 116. In that manner, the annular sealing ridge 22 is formed.

In accordance with the principles of the present invention, the downward extent of movement of the plunger 108 during the forming stroke is not positively limited but depends upon the physical characteristics of the thermoplastic material utilized to form the gasket or liner. In that manner, the central web portion 23 of the gasket has a minimum thickness dependent upon the compressibility of the material and its flow characteristics. In order to remove any positive limit on the downward extent of the plunger 108, the rollers 143 are positioned on the guide posts 119 so that at the end of the forming stroke a slight space as at 168 is left between the rollers and the upper surface 147 of the upper support member 101.

It is further contemplated by the present invention to provide resiliently driven striking means, generally indicated at 171, cooperating with the springs 132 during the forming stroke for driving the plunger toward the anvil surface 97 to form or mold the thermoplastic material.

Figure 7:
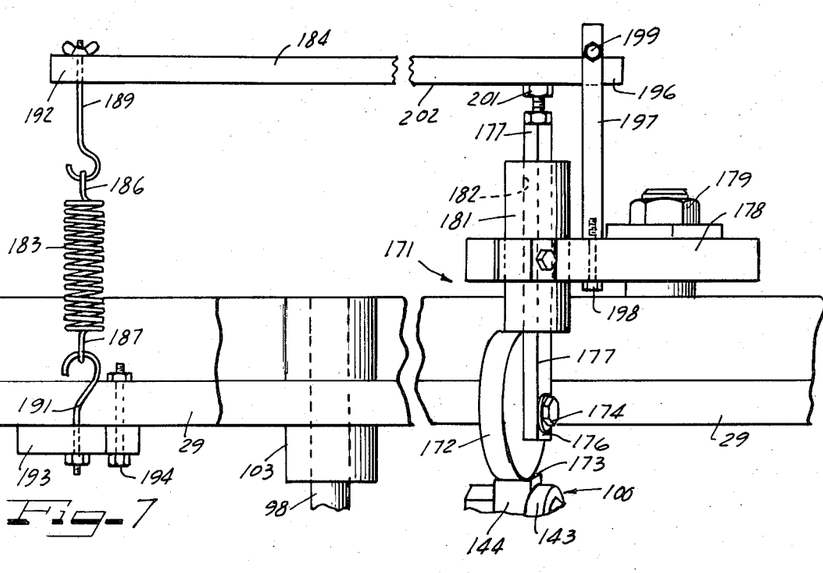
FIG. 7 is an enlarged side elevational view taken approximately along line VII—VII of FIG. 1 and illustrating striking means for resiliently driving the forming head into molding contact with thermoplastic material disposed within the bottle crowns.

As illustrated in FIGS. 1, 5 and 7 the striking means include a roller 172 supported over an uppermost end 173 of the guide posts 119 for rotational movement about a horizontal axis extending substantially radially of the annular anvil surface 97 and for vertical, reciprocal movement toward and away from the anvil surface. The roller 172 is journaled on a suitable axle shaft having one end fastened as at 174 to a lower end portion 176 of a slide bar 177. A support bracket 178 anchored to the upper frame member 29 by a nut and bolt assembly 179 fixedly holds a guide member 181 having a throughbore 182 slidably receiving the bar 177.

Means for resiliently driving the roller 172 toward the anvil surface 97 include a tension spring 183 operating on one end portion of a lever bar 184. The tension spring 183 has opposite looped end portions 186 and 187 respectively retained in hook members 189 and 191, which in turn are respectively fastened to an outer end 192 of the lever 184 and a strut 193 fastened to the frame member 29 by suitable fastening means as at 194. An end 196 of the lever 184 opposite the end 192 is disposed between a pair of upstanding, spaced-apart posts 197 secured to the bracket 178 by fasteners 198. A rod 199 extending between, and secured in, the upstanding posts 197 forms a fulcrum point for the lever bar 184. A threaded member, such as a bolt as at 201, adjustably received in the slide bar 177 and extending upwardly therefrom engages an underneath surface 202 of the lever bar 184 in a manner to cooperate with the fulcrum point for forming a second order lever arrangement to downwardly urge the slide bar and thus the roller 172 under the resilient biasing force of the spring 183.

Referring to FIG. 5, the axis of rotation of the roller 172 is slightly disposed beyond a terminal end 203 of the sharply sloped cam surface 161, and a diameter of the roller is sized relative to a circumferential spacing between adjacent ones of the forming heads 100 so that as one of the forming heads reaches the downward extent of its movement during the forming stroke, the uppermost end surface 173 of an adjacent forming head is moving into contact with an outer periphery 204 of the roller. Further rotation of the forming station 16 moves the roller 143 along the planar cam surface 159, thereby raising the roller 172 due to engagement of the upper guide post surface 173 with the roller outer periphery 204. As the roller 172 raises, the lever arm moves about the fulcrum point in a clockwise direction to deform the spring 183. In that manner, as the rollers 143 on the guide posts 119 move down the sharply sloped cam surface 161, the combined resilient biasing of the springs 132 and 183 suddenly, resiliently drive the plungers 108 into forming contact with the slugs 17 of thermoplastic material disposed within the crowns 12.

Subsequent to molding or forming the thermoplastic material into the gasket configuration, the plunger 108 is held in the forming position by the spring 132. According to the present invention, the plunger 108 is resiliently held in the forming position for a time interval sufficient to air cool the thermoplastic material to a set or hardened condition, thereby eliminating any necessity for water-type cooling means. Thus, the circumferential travel from the cam trailing end portion 156 to the cam leading end portion 151 is selected relative to a circumferential velocity of the anvil surface 97 to enable sufficient air cooling of the material as one of the forming heads 100 moves from the cam trailing end portion to the cam leading end portion 151 where the forming heads are raised to release the completed crowns 12. The circumference of the anvil surface 97, the number and spacing of the forming heads 100, the circumferential velocity of the anvil surface and the arcuate length of the cam plate may be varied to select a desired production rate as long as sufficient cooling time is provided.

To enhance cooling, the lower, apertured supported member 102 is spaced from the anvil surface 97 by insulating washer as at 209.

It has been found to be desirable to maintain the anvil surface 97 at an elevated temperature in the range of 130° to 200° F. to insure that the slugs 17 are molded into the proper configuration. If the temperature of the anvil surface is below that range, the linings will not completely fill the annular space between the forming head 116 and the outer member 111, whereas temperatures above that range result in the liners being formed with a wrinkled surface. During normal continuous operation of the apparatus 10, heat transfer from the heated crowns 12 and the material, heated to a plastic state normally maintain the anvil surface 97 in the proper temperature range. However, to eliminate defectively lined crowns when the apparatus 10 is initially operated, heating means as at 210 may be provided for preheating the peripheral margin of the table 96, as illustrated in FIG. 1. One form of the heating means 210 includes a gas jet 211 supplied with a controlled quantity of gaseous fuel via the pipe 212. If desired, temperature sensing means as at 213 may be provided for controlling the supply of fuel to the jet 211 in response to the temperature of the anvil surface 97.

In one example of the apparatus of the present invention, the forming station 16 included seventy-two forming heads equally spaced around an anvil surface having a circumference of approximately 100 inches and with the cam plate having an arcuate extent of approximately 18 inches and was rotated at a speed slightly in excess of 10 revolutions per minute, thereby forming approximately 750 lined crowns per minute. Thus, each one of the forming heads contacted and formed approximately ten crowns per minute, thereby providing an air cooling interval of slightly less than 6 seconds.

Although those versed in the art may suggest various minor modifications, it should be understood that I wish to embody within the scope of the patent warranted hereon all such modifications as reasonably and properly come within the scope of my contribution to the art.

I claim as my invention:

1. An apparatus for forming thermoplastic liners in bottle crowns of the type having a central wall portion and an offset bottle gripping flange extending around a periphery of the central wall portion, the apparatus comprising:
   conveying means receiving and supporting the bottle crowns in spaced relationship with the crown flanges extending upwardly, said conveying means advancing the supported crowns along a set conveyor path;

dispensing means disposed along the conveyor path depositing a metered quantity of thermoplastic material heated to a plastic state into each one of the crowns;

a forming station disposed along the conveyor path down-stream of said dispensing means and including means forming a horizontally extending anvil surface mounted for movement along a path underlying the conveyor path so that the crowns are advanced onto said anvil surface by said conveying means, a plurality of equally spaced forming means overlying said anvil surface and mounted for movement therewith and for reciprocal movement perpendicular thereto;

drive means for moving said anvil surface in timed relation to said conveying means so that successive ones of said forming means are moved into registry with successive ones of the crowns;

resilient means urging said forming means toward said anvil surface;

cam means cooperating with said forming means as said forming means advance thereto, for controlling the vertical position of said forming means relative to said anvil surface;

said cam means having a leading portion engaging said forming means prior to movement of said forming means into registry with the crowns and raising said forming means a distance sufficient to enable the insertion of the crowns between the lowermost end of said forming means and said anvil surface, said cam means also having a trailing portion engaged by said forming means while the same are in registry with the crowns and accommodating vertical movement of said forming means into successive ones of the crowns by the bias of said resilient means, striking means supported by said forming means and applying a sudden, downwardly directed striking force to said forming means while the same are in registry with the crowns, thereby to substantially instantaneously squeeze the thermoplastic material between the crown central wall portion and said forming means, said trailing portion of said cam means having a first cam surface enabling vertical movement of said forming means into successive ones of said crowns a distance sufficient to overlap the bottle gripping flange while maintaining said forming means out of contact with the thermoplastic material disposed within the crowns, thereby to positively transfer the crowns from said conveying means and onto said anvil surface.

2. An apparatus as defined in claim 1, and further characterized by:

said trailing portion of said cam means having another cam surface disposed in advance of said first cam surface and beneath said striking means and enabling further vertical movement of said forming means into said crowns for contacting and molding the material.

3. The apparatus of claim 1, wherein the anvil surface has a circumferential outer periphery and is mounted for movement along a continuous circumferential path, and wherein the cam means is spaced above said anvil and conforms to the continuous path of movement thereof and is stationary and extends over and beyond said conveying means.

4. An apparatus as defined in claim 1, wherein each of said forming means comprise:

a plunger including a forming head disposed at a lower end portion thereof and having a cylindrical outer periphery;

an intermediate, cylindrical member telescopically received over said forming head;

an outer cylindrical member telescopically received over said intermediate member; and resilient means separately urging each of said plunger, said intermediate member and said outer member toward said anvil surface.

5. The apparatus of claim 1, wherein the striking means comprises a roller mounted for reciprocal movement toward and from said forming means and spring means biasing said roller to engage said forming means with a hammer-like blow as said forming means pass to the trailing end portion of said cam means.

6. An apparatus for forming thermoplastic liners in bottle crowns of the type having a central wall portion and an offset bottle gripping flange extending around a periphery of the central wall portion, the apparatus comprising:

conveying means receiving and supporting the bottle crowns in spaced relationship with the crown flanges extending upwardly, said conveying means advancing the supported crown along a set conveyor path;

dispensing means disposed along the conveyor path depositing a metered quantity of thermoplastic material heated to a plastic state into each one of the crowns;

a forming station disposed along the conveyor path downstream of said dispensing means and including means forming a horizontally extending anvil surface mounted for movement along a path underlying the conveyor path to accommodate the crowns to be advanced onto said anvil surface, a plurality of equally spaced forming means overlying said anvil surface and mounted for movement therewith and for reciprocal movement perpendicular thereto;

drive means for moving said anvil surface in timed relation to said conveying means so that successive ones of said forming means are moved into registry with successive ones of the crowns advanced by said conveying means;

resilient driven striking means supported over said forming means and applying a sudden, downwardly directed striking force to said forming means while the same are in registry with the crowns, thereby to substantially instantaneously squeeze the thermoplastic material between the crown central wall portion and said forming means, means heating the thermoplastic material to a moldable state;

a discharge nozzle receiving the heated material and having a horizontally extending outlet opening over the conveyor path;

screw conveying means operating in time with said crown conveying means and discharging a continuous column of material through said outlet at a rate selected to provide a predetermined quantity of material for each one of the crowns passing therebeneath;

means forming a knife blade for severing the discharged column, said knife blade mounted for effecting movement relative to the outlet; and means moving said knife blade in synchronism with said crown conveying means and in a direction for imparting a downwardly directed impetus to a severed link of the discharged column for positively depositing the material into the crowns passing beneath said dispensing means.

7. A forming station for molding metered quantities of thermoplastic material disposed within bottle crowns into sealing gaskets, the crowns each having a central wall portion and an offset bottle gripping flange extending around a periphery of the central wall portion, the station comprising:

means forming a horizontally extending anvil surface mounted for movement along a continuous path and receiving a series of equally spaced ones of the crowns;

a plurality of equally spaced forming means overlying said anvil surface and mounted for movement therewith and for reciprocal movement perpendicular thereto;

resilient means urging said forming means toward said anvil surface;

cam means disposed adjacent said continuous path of said anvil surface and cooperating with a portion of said forming means for controlling the vertical position of said forming means relative to said anvil surface;

said cam means having a leading portion engaging said forming means prior to the same being moved into registry with the crowns advanced by said conveying means and raising said forming means a distance sufficient to enable the insertion of the crowns between a lowermost end of said forming means and said anvil surface, said cam means having a trailing portion engaged by said forming means while the same are in registry with ones of the crowns advanced by said conveying means and enabling vertical movement of said forming means into successive ones of the crowns under the urging of said resilient means;

said trailing portion of said cam means having a first cam surface enabling vertical movement of said forming means into successive ones of the crowns a distance sufficient to overlap the bottle gripping flange while maintaining said forming means out of contact with the thermoplastic material disposed within the crowns to thereby transfer the crowns from said conveying means onto said anvil surface;

drive means for moving said anvil surface so that successive ones of said forming means are moved into registry with successive ones of the crowns received on said anvil surface;

striking means supported over said forming means and applying a sudden, downwardly directed striking force to said forming means while the same are in registry with the crowns, thereby to substantially instantaneously squeeze the thermoplastic material between the crown central wall portion and said forming means.

8. An apparatus as defined in claim 7, and further characterized by:

said trailing portion of said cam means having another cam surface disposed beyond said first cam surface and beneath said striking means and enabling further vertical movement of said forming means into said crowns for contacting and molding the material.

* * * * *